United States Patent [19]

Atwell et al.

[11] Patent Number: 5,072,448

[45] Date of Patent: Dec. 10, 1991

[54] QUASI-RANDOM DIGITAL SEQUENCE DETECTOR

[75] Inventors: Keith E. Atwell, Meridianville; Harold A. Vaghy, Huntsville, both of Ala.

[73] Assignee: Universal Data Systems, Inc., Huntsville, Ala.

[21] Appl. No.: 430,453

[22] Filed: Nov. 2, 1989

[51] Int. Cl.$^5$ ............................................. H04L 1/14
[52] U.S. Cl. ................................. 371/20.4; 371/20.5
[58] Field of Search .................... 371/20.4, 20.5, 68.2; 370/15

[56] References Cited

U.S. PATENT DOCUMENTS

| | | | |
|---|---|---|---|
| Re. 30,037 | 6/1979 | Bass | 371/20.5 |
| 4,271,513 | 6/1981 | Maejima et al. | 370/15 |
| 4,852,103 | 7/1989 | Fujimura | 371/68.2 |

Primary Examiner—Jerry Smith
Assistant Examiner—Henry C. Lebowitz
Attorney, Agent, or Firm—Charles L. Warren; Anthony J. Sarli, Jr.

[57] ABSTRACT

Errors in a predetermined digital sequence are detected by utilizing a detector which includes memory elements such as a series shift register, and logic gates for detecting a predetermined subsequence. Errors are detected by comparing each bit in the data stream with the output of the memory. Logic gates inhibit the detection of an error in response to the subsequence detection.

11 Claims, 1 Drawing Sheet

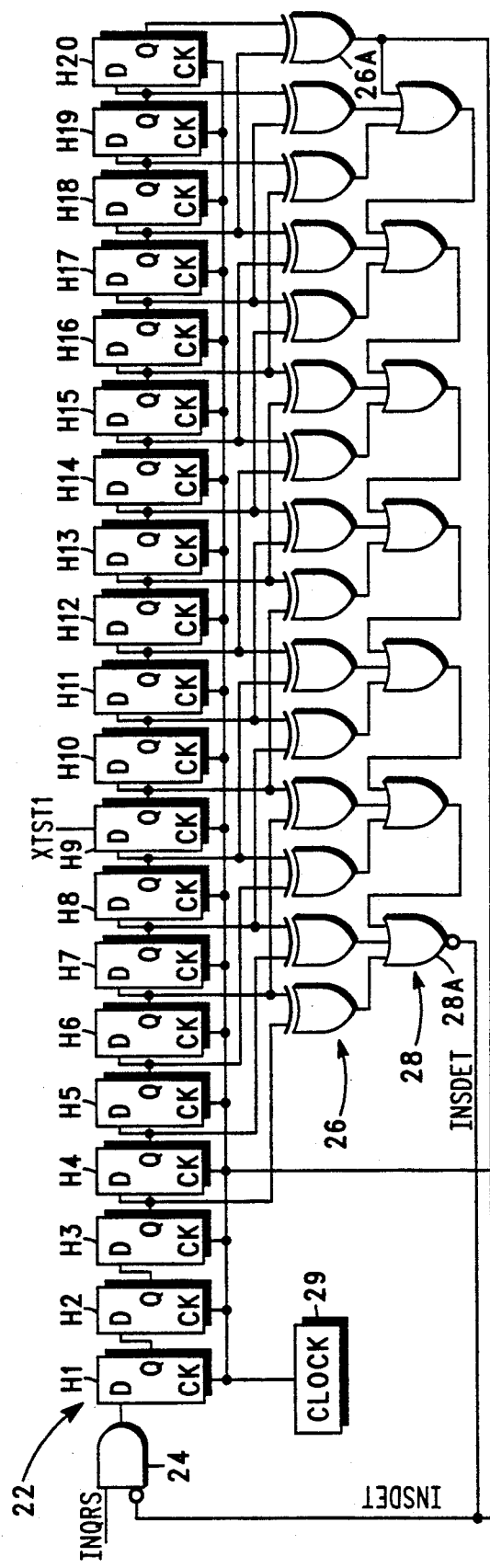
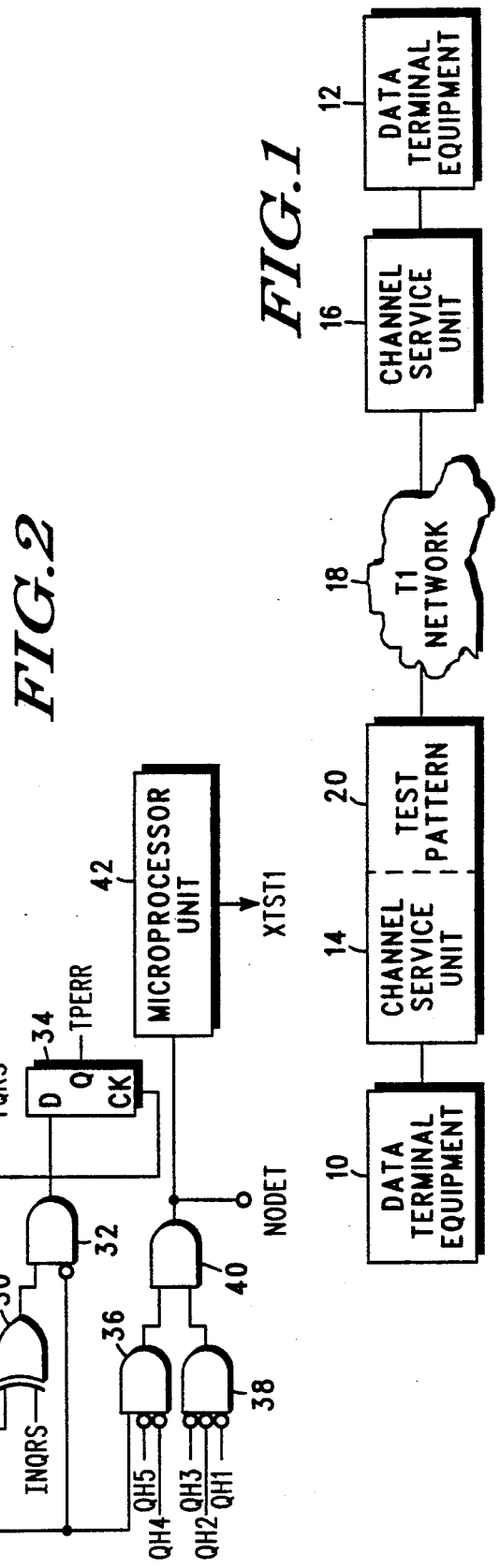

QUASI-RANDOM DIGITAL SEQUENCE DETECTOR

BACKGROUND OF THE INVENTION

This invention relates generally to digital signal detectors and more specifically to detecting a predetermined quasi-random data sequence. As used herein, a quasi-random data sequence means a predetermined periodic sequence of data which simulates random data.

Although it is possible to generate true random data, a quasi-random sequence often can be utilized in its place such as for a test pattern utilized to verify the operation of a data network. The quasi-random sequence has the advantage that it's predetermined pattern can be compared with a received transmission of the sequence for bit error rate measurement.

Quasi-random generators often comprise series of interconnected flip-flops in which certain selected stages are combined to provide feedback to earlier stages. Such a generator having N stages can generate a digital sequence of $2^N$.

One way to detect a quasi-random digital sequence is to store all the bits in one periodic cycle of the quasi-random generator and compare this stored pattern against received data. For quasi-random sequences having a large number of bits this technique either required significant hardware or is computationally intensive if implemented in software.

It is an object of the present invention to provide an improved quasi-random sequence detector which utilizes a minimum of memory cells and associated control logic.

BRIEF DESCRIPTION OF THE DRAWINGS

FIG. 1 illustrates a system in which a channel service unit (CSU) incorporates a detector according to the present invention.

FIG. 2 is a schematic diagram illustrating an embodiment of a quasi-random signal detector in accordance with the present invention.

DETAILED DESCRIPTION

The embodiment of the presesnt invention described below addresses the detection of a particular digital test pattern, a quasi-random signal source (QRSS) pattern, used in T1 networks. This pattern provides a means of simulating data transmission for testing the network. The QRSS pattern consists of a 1,048,575 bit sequence generated by a 20-bit shift register with feedback taken from bit 17 and bit 20. The output is taken from bit 20 and is forced to be a logic 1 whenever the next 14 bits will all be logic 0.

The following equations define the QRSS pattern.

$$Q_{n+1}(k+1) = Q_n(k) \quad n = 1, 2, \ldots, 18, 19 \quad \text{(Eq. 1)}$$

$$Q_1(k+1) = Q_{17}(k) @ Q_{20}(k) \quad \text{(Eq. 2)}$$

$$RD(k) = Q_{20}(k) + \overline{Q_6(k) + \ldots + Q_{19}(k)} \quad \text{(Eq. 3)}$$

where,
$Q_n(k)$ = Present State for Stage n
$Q_n(k+1)$ = Next State for Stage n
$RD(k)$ = Present Value of Output
@ = Exclusive OR function The generation of the QRSS pattern is defined in further detail in American Telephone & Telegraph Technical Reference 62411.

FIG. 1 illustrates a digital network having data terminal equipment (DTE) 10 and 12 which communicate via channel service units (CSU) 14 and 16 over a T1 network 18. CSU 14 includes a test pattern (TP) circuit 20 consisting of a QRSS pattern generator and, in accordance with the present invention, a QRSS detector.

The purpose of TP 20 is to generate and transmit a test pattern through the T1 network 18 to CSU 16 which is configured in a loopback mode so that the received pattern is transmitted back through the T1 network 18 to the test pattern detector in CSU 14. By comparing the received data with the transmitted pattern, a figure of merit or bit error rate for the system can be measured.

It will be appreciated that all CSU's and other network equipment could contain a TP circuit so that the test could be originated from different locations. The present invention addresses a detector suited for use as the QRSS detector.

The schematic diagram of FIG. 2 illustrates an embodiment of a QRSS detector according to the present invention. A twenty bit shift register 22 consists of interconnected flip-flops H1–H20. Of the incoming data bits (INQRS), the state of certain of the bits are changed before being shifted into the shift register by gate 24 as controlled by signal INSDET. The exclusive OR (XOR) gates 26 exclusively OR the output of every third stage from stage H3 to stage H20. The outputs of XOR gates 26 are combined by NOR gates 28. The final NOR'ed output from gate 28A produces the control signal INSDET.

The only QRSS condition wherein every third bit between stage H3 and H20 is the same is when the next INQRS bit will be a "forced" 1 by the generator because of the generation definition that the output bit must be a 1 whenever the next 14 bits will be all 0's. When such a condition is detected, the forced 1 present at INQRS is inhibited by gate 24 thereby causing a 0 to be shifted into the shift register at the next clock generated by clock 29.

One aspect of this invention resides in the identification of the problem involved in detecting the QRSS test pattern and particularly the complication added by a system constraint in which no more than 14 consecutive 0's are allowed. Each of the possible bit sequences of the generator which would contain more than fourteen 0's was identified and compared for similarities. The identification of a unique preceding pattern that did not occur except prior to a forced 1 insertion led to the implementation of the control logic associated with the 20 bit register utilized in the present detector.

The output signal TQRS from XOR gate 26A represents the predicted incoming bit. The predicted bit TQRS and the received incoming bit INQRS are compared by XOR gate 30. Except when inhibited by gate 32 in response to an INSDET condition, the output of gate 30 is utilized to drive flip-flop 34 whose output represents an error indication TPERR. One bit error will generate two more detected errors as the erroneous bit shifts through shift register 22. Thus, counting the number of errors indicated by TPERR and dividing the result by three can be utilized to compute the bit error rate of the system under test.

The following equations determine TPERR and the output of stage H1.

$$TQRS = QH17 \oplus QH20 \quad \text{(Eq. 4)}$$

$$INSDET = \overline{\overline{((QH3 \oplus QH6) + QH4 \oplus QH7) + \ldots} \quad \text{(Eq. 5)}$$
$$\overline{\ldots + (QH16 \oplus QH19) + (QH17 \oplus QH20))}$$

$$TPERR = (INQRS \oplus TQRS) \cdot \overline{INSDET} \quad \text{(Eq. 6)}$$

$$QH1^+ = \overline{INSDET} \cdot \overline{INQRS} \quad \text{(Eq. 7)}$$

Gates 36, 38 and 40 comprise a detector which detects when each stage of shift register 22 contains a 0. This signal (NODET) is generated by AND'ing the outputs QH1-QH5 of registers H1-H5 and INSDET. When a NODET condition is detected, the output of stage H9 is forced to a 1 by control signal XTST1 which is coupled to the set input of flip-flop H9. While the NODET signal could be directly utilized as XTST1, it is preferred that the NODET signal be sensed by an associated microprocessor system 42 which in turn provides the HTXT1 signal to gate H9. Normally the present detector will be implemented as part of other equipment such as a CSU which will have a microprocessor system that can provide this function as well as counting the number of errors (TPERR). It is desired to set one stage such as H9 to a 1 when all other stages are 0 to initialize the detector.

For example, during initial power up all stages of shift register 22 may have a default output of 0. Thus, the NODET signal is useful for detecting such a condition and forcing at least one stage to be a 1 thereby enabling the detector to more quickly identify the reception of a QRSS sequence. Upon such initialization this detector is able to detect an incoming QRSS sequence within 20 bits.

It is believed that this detector represents a near optimum implementation of a QRSS detector since the sequence is generated by use of a 20 stage register. Thus, the amount of memory in the detector does not exceed the amount of memory needed to generate the sequence.

Due to the bit rate associated with the T1 network, it is currently advantageous to implement the present invention with discrete logic as illustrated in FIG. 2. However, a software implementation in accordance with the present invention is possible by utilizing high performance microprocessors or digital signal processors with sufficient computing capability and speed. In such a software implementation, only 20 bits of memory would be required in order to store the incoming data sequence. Boolean logic simulating the control gate functions of the embodiment shown in FIG. 2 could be utilized in the software implementation.

Although an embodiment of the present invention has been described and shown in the drawings, the scope of the invention is defined by the claims which follow.

We claim:

1. A detector for detecting errors in a predetermined sequence of bits in a digital data stream comprising:
   a) memory means for receiving and storing a plurality of bits in said data stream, said memory means having a plurality of memory elements and an output whose digital state depends on the contents of said elements;
   b) logic means for detecting a predetermined subsequence in said sequence based on the contents of said elements;
   c) means for detecting errors in said predetermined sequence by comparing each bit in said data stream with the state of said output; and
   d) means for inhibiting said error detecting means in response to said logic means detecting said subsequence.

2. The detector according to claim 1 wherein said memory means comprises a shift register.

3. The detector according to claim 2 wherein said logic means comprises logic gates connected to stages of said shift register.

4. The detector according to claim 1 wherein said inhibiting means comprises at least one logic gate coupled to inhibit said error detecting means.

5. The detector according to claim 1 wherein said inhibiting means comprises means connected to said memory means for changing the state of a received bit before said memory means receives same upon the detection of said subsequence.

6. The detector according to claim 1 wherein said sequence is a quasi-random data sequence.

7. The detector according to claim 6 wherein said sequence comprises a quasi-random signal source (QRSS) sequence.

8. The detector according to claim 1 in which the number of said memory elements does not exceed the amount of memory utilized to generate said predetermined sequence.

9. The detector according to claim 1 wherein said memory means consecutively receives and stores said bits.

10. A method of detecting errors in a predetermined sequence of bits in a digital data stream comprising the steps of:
    a) receiving and storing a plurality of bits in said data stream in a plurality of memory elements;
    b) generating an output whose digital state depends on the contents of said memory elements;
    c) detecting a predetermined subsequence in said sequence based on the contents of said memory elements;
    d) detecting errors in said predetermined sequence by comparing each bit in the data stream with the state of said output; and
    e) inhibiting the detecting of errors in response to the detection of said subsequence.

11. The method according to claim 10 wherein said sequence comprises a quasi-random sequence and wherein the number of said memory elements does not exceed the amount of memory utilized in generating said quasi-random sequence.

* * * * *